United States Patent [19]
King

[11] 3,811,806
[45] May 21, 1974

[54] LUBRICATING SYSTEM FOR ROTARY MACHINE

[75] Inventor: Robert W. King, Sidney, Ohio

[73] Assignee: Copeland Refrigeration Corporation, Sidney, Ohio

[22] Filed: Feb. 1, 1972

[21] Appl. No.: 222,602

[52] U.S. Cl............ 418/100, 418/84, 418/90, 418/97, 123/8.01, 123/8.45, 184/64, 184/68
[51] Int. Cl............................................. F01c 21/00
[58] Field of Search........... 418/84, 90, 91, 97, 98, 418/100; 123/8.01, 8.45; 184/64, 68

[56] References Cited
UNITED STATES PATENTS

| | | | |
|---|---|---|---|
| 2,951,633 | 9/1960 | Fites | 417/282 |
| 3,460,814 | 2/1949 | Derr, Jr. | 418/90 |
| 1,686,569 | 10/1928 | McMillan | 418/91 |
| 3,273,544 | 9/1966 | Bensinger et al. | 123/8.01 |
| 1,475,683 | 11/1923 | Carrey | 418/94 |
| 1,925,556 | 9/1933 | Davenport | 418/91 |
| 1,977,109 | 10/1934 | Badger | 418/64 |
| 2,018,341 | 10/1935 | Badger | 418/64 |
| 3,245,386 | 4/1966 | Bentele | 418/99 |

Primary Examiner—C. J. Husar
Attorney, Agent, or Firm—Harness, Dickey & Pierce

[57] ABSTRACT

A lubricating system primarily for a rotary piston machine such as a rotating internal combustion engine. The lubricating system includes a conduit that leads from the lubricant sump to a chamber of the mechanism that cyclically changes in volume. When the volume is increasing, the pressure differential acting on the conduit forces oil or other lubricant from the sump into the chamber to lubricate the rotating members. In one embodiment, the pressure differential caused by the changes in volume of the chamber is also used to deliver lubricant to bearings of the mechanism. In each embodiment a capillary device in the form of a porous member meters the flow of lubricant.

5 Claims, 4 Drawing Figures

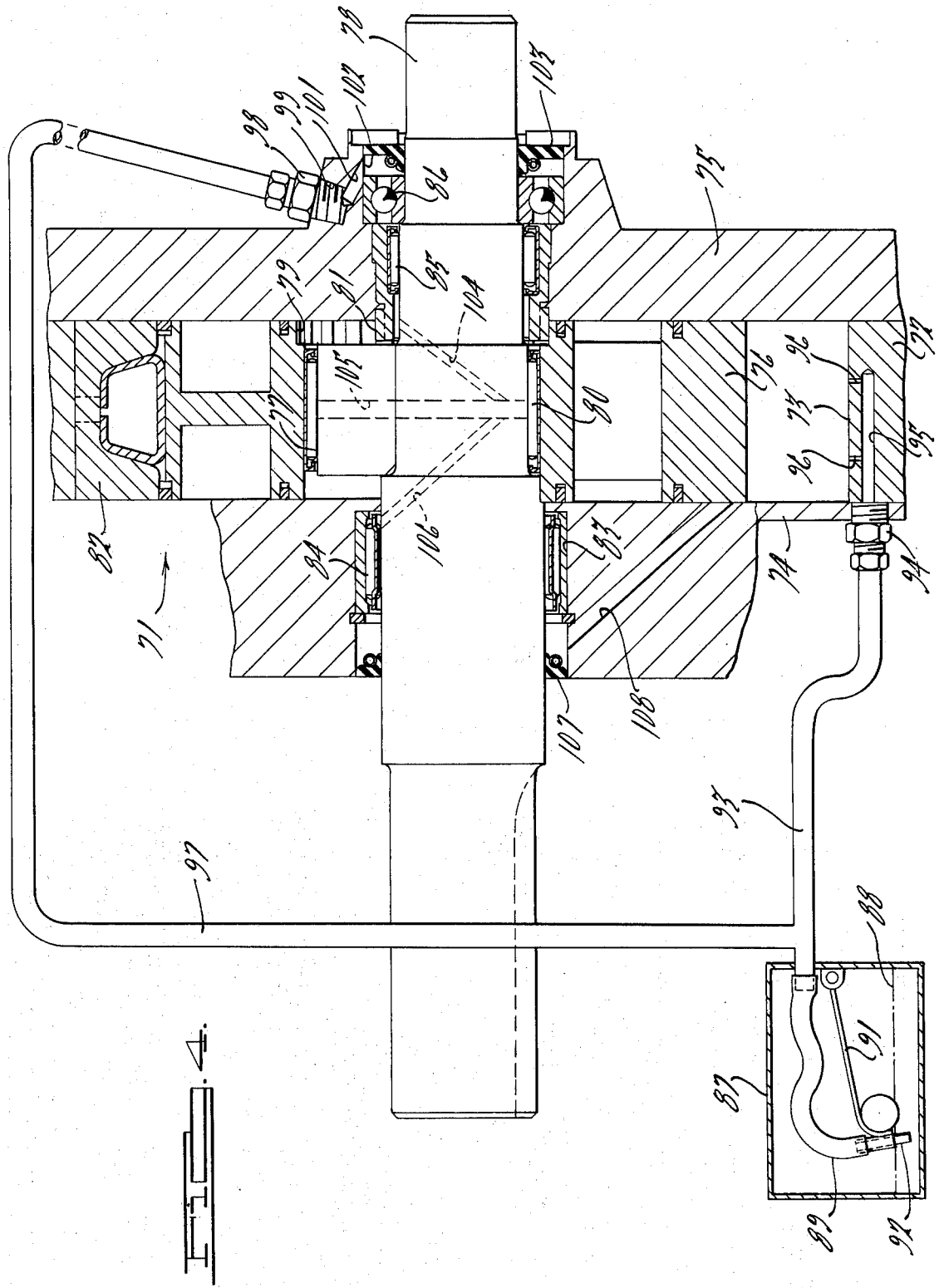

LUBRICATING SYSTEM FOR ROTARY MACHINE

BACKGROUND OF THE INVENTION

This invention relates to a lubricating system for a rotary machine and more particularly to a lubricating system that uses, at least in part, the pressure differentials caused by the varying of the volume of a chamber of the machine for delivering lubricant to certain parts of the machine.

Various types of mechanisms have been proposed in which two or more members cooperate to define a chamber of cyclically varying volume. Such mechanisms may be used as pumps, compressors or internal combustion engines operated either on the two or fourth stroke cycle principle. The cooperating members normally have interengaging surfaces that move relative to each other and which must be lubricated in some manner. A variety of systems have been employed for lubricating these surfaces. Such lubricating systems fall into two general classes or combinations of these classes. The lubricant may be delivered to the surfaces by a so called "splash system" or the lubricant may be positively delivered to the surfaces by a pump. Although the splash system has been successful in many applications, it is not completely foolproof and does not always insure good lubrication. Positive lubrication systems, on the other hand, are expensive.

It is, therefore, a principle object of this invention to provide an improved lubricating system for a mechanism that does not rely entirely on a separate pump nor does it rely upon splash type lubrication.

Specifically, it is an object of this invention to provide a lubrication system for a mechanism having a chamber with a cyclically varying volume in which the cyclic variations of the volume are used to generate a pressure differential for drawing lubricant into the chamber.

One type of mechanism that has recently generated considerable interest as an engine, pump or compressor is the rotary piston machine. Such a machine has a lobed piston that is contained within a lobed housing. The piston and housing have a different number of lobes and move relative to each other to form one or more chambers of varying volume upon their relative movement. Seals are provided between the lobed periphery of the piston and the housing to prevent leakage from one chamber to the other. These seals have experienced considerable wear and it has been found necessary to provide good lubrication for them. This has been done in the case of engines by providing a positive lubricating system for the seals via passages that extend through the rotating piston or through a peripheral wall of the housing or by mixing lubricating oil with the fuel that is burned. The defects of providing lubrication by means of pressure lubrication through the piston or outer housing are common to those of other mechanisms, i.e. cost. The necessity for mixing lubricating oil with the fuel has proven to be a nuisance and damaged results to the mechanism if the lubricant is not added or is not added in sufficient quantities. Alternatively, if too much lubricant is added smoking results.

It is, therefore, another object of this invention to provide an improved lubricating system for lubricating the seals of a rotary piston machine.

It is another object of this invention to provide a lubricating system for a rotary mechanism that uses pressure differentials generated by the mechanism to deliver lubricant to the mechanism and which incorporates an improved metering system for the lubricant.

SUMMARY OF THE INVENTION

A feature of this invention is adapted to be embodied in a lubricating system for a machine having a chamber of cyclically varying volume and a sump for lubricant. The system comprises conduit means that lead from the sump to the chamber for introducing lubricant from the sump to the chamber under the influence of pressure differences generated by expansion of the volume of the chamber. Metering means are incorporated for controlling the flow through the conduit.

Another feature of the invention is adapted to be embodied in a rotary mechanism having at least a pair of relatively rotatable members that cooperate to define at least one chamber that cyclically varies in volume upon relative rotation between the members. A sump contains lubricant and conduit means lead from the sump to a position in one of the members that is exposed at least in part to the pressure in the chamber for delivering lubricant from the sump to the chamber upon the cyclic variations in volume.

BRIEF DESCRIPTION OF THE DRAWINGS

FIG. 4 is a cross sectional view of another embodiment of the invention taken along a plane perpendicular to the plane along which FIG. 1 was taken.

DETAILED DESCRIPTION OF THE PREFERRED EMBODIMENTS

The invention disclosed herein is described in conjunction with a rotary piston internal combustion engine. It is to be understood, however, that certain features of this invention may be used in conjunction with other types of mechanisms or with a rotary piston mechanism that functions as a pump or compressor rather than as an engine.

Figure 1:
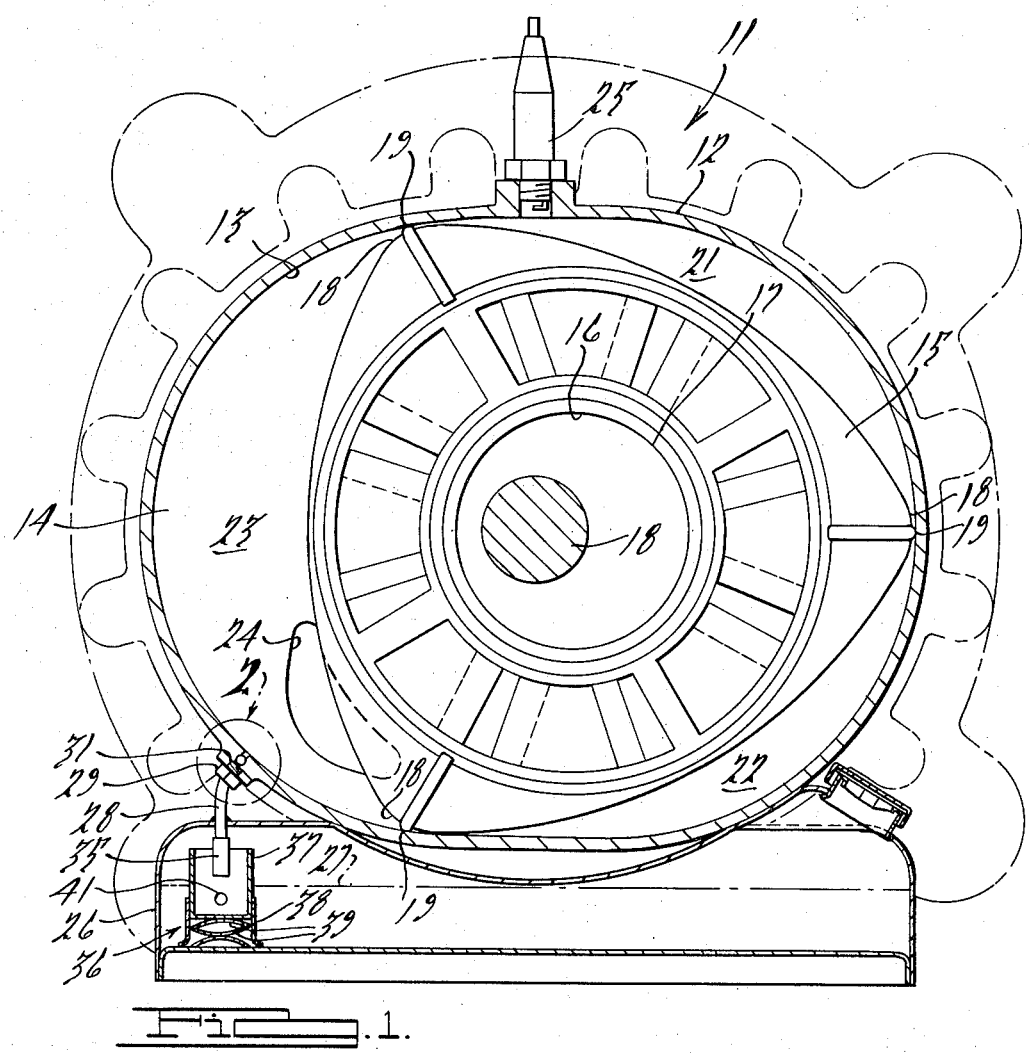
FIG. 1 is a cross sectional view of a rotary piston, internal combustion engine embodying this invention.
Figures 2, 3:
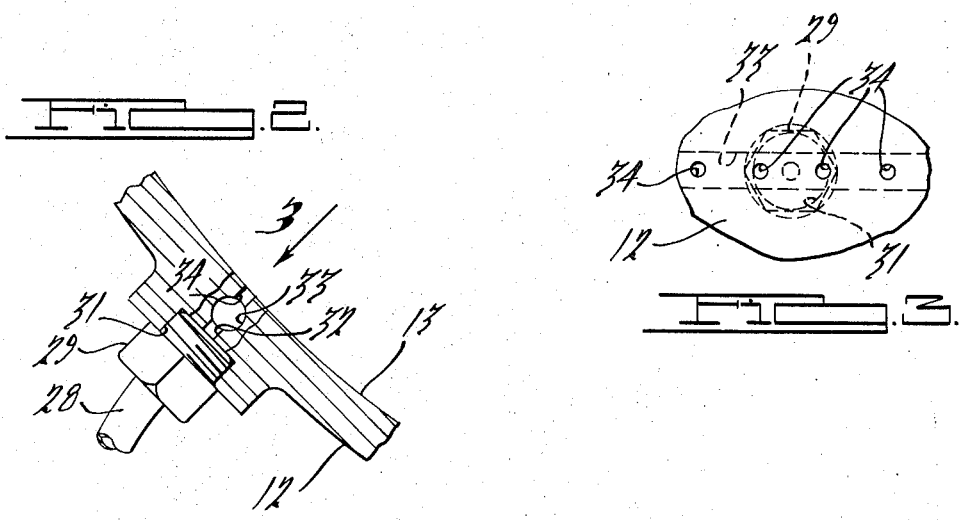
FIG. 2 is an enlarged view of the area encompassed by the circle 2 in FIG. 1.
FIG. 3 is a view taken in the direction of the arrow 3 in FIG. 2.

Referring first to the embodiment of FIGS. 1 through 3, a rotary piston engine incorporating a first embodiment of the invention is identified generally by the reference numeral 11. The engine 11 includes an outer housing 12 having a peripheral inner wall 13 closed at its opposite sides by end plates 14 (only one of which appears in the drawings). A rotor or rotary piston 15 is supported within the chamber defined by the peripheral wall 13 and end walls 14. The rotor 15 has a cylindrical inner surface 16 that is journalled upon an eccentric cylindrical surface 17 of an output shaft 18. As is well known with this type of mechanism, timing gears are fixed relative to the outer housing and to the rotor 15 so as to correlate the relative rotation of these elements.

Although the mechanism may be of any desired configuration, in the illustrated embodiment the outer housing is affixed against rotation and defines two lobes. The rotor 15 has three apexes 18 that are disposed in close proximity to the peripheral wall 13 of the outer housing. Apex seals 19 of any known type, are supported within the apexes 18 and sealingly engage the peripheral wall 13. Thus, three chambers indicated generally by the reference numerals 21, 22 and 23 are formed between the rotor 15, outer housing 12 and end walls 14. As is well known with this type of mechanism, rotation of the rotor 15 relative to the outer housing 12 causes the chambers 21, 22 and 23 to cyclically vary in volume.

So that the mechanism can function as an internal combustion engine, an intake port 24 is formed in one of the end walls 14 and an exhaust port (not shown) is formed either in one of the end walls or in the peripheral wall 13 at a suitable location. A spark plug 25 is disposed at an area that is between the intake port 24 and the exhaust port.

FIG. 1 of the drawings illustrates the mechanism in a position in which the chamber 23 is expanding in volume and is drawing a charge through the intake port 24. The chamber 21 is in registry with the spark plug 25, which will have already fired at the angular position shown, and is expanding under a power stroke. The chamber 22 has completed its power stroke expansion and is decreasing in volume for forcing the burned combustion gases from within this chamber through the exhaust port. Rotation of the rotor 15 within the outer housing 12 will cause each of the chambers 21, 22 and 23 to cyclically vary in volume and to undergo the four cycles of the four stroke cycle internal combustion engine process.

The construction of the mechanism thus far described is conventional and for this reason specific details have been omitted. With this type of mechanism, however, it has been found necessary to provide lubrication for the apex seals 19. This has been done by providing positive lubrication through the rotor or outer housing by means of a pump or by mixing lubricating oil with the intake charge. For the reasons aforenoted, neither of these arrangements are completely satisfactory.

The embodiment shown in FIGS. 1 through 3 includes an improved arrangement for lubricating the apex seals 19 in a highly efficient and yet low cost manner. In this embodiment, the various journalled surfaces of the engine and specifically those of the output shaft 18 and bearing surfaces 16 and 17 may be pressure lubricated by an oiling system of the type shown in U.S. Letters Patent No. 3,583,371, entitled "Oil Pump For Rotary Machine" issued June 8, 1971 in my name. The lubricating oil is contained within a sump 26 that is positioned beneath the outer housing 12. The normal level of oil in the sump 26 is indicated by the broken line 27.

In order to lubricate the apex seals 19, a conduit 28 is provided that extends from the sump 26 into the chamber of the engine that is in registry with the intake port 24. The conduit 28 has a fitting 29 at its upper end that is threaded into a tapped hole 31 formed in the outer housing 12. The tapped hole 31 is intersected by a smaller diameter passage 32 which, in turn, intersects a perpendicularly disposed passage 33 (FIGS. 2 and 3). The passage 33 extends across the outer housing 12 from one end face to the other in a direction parallel to the axis of rotation of the shaft 18. The opposite ends of the passage 33 are closed by the end plates 14 of the engine. The passage 33 is intersected by a member of inlet passages 34 that extend from the passage 33 through the inner surface 13 of the outer housing 12. Thus, the passages 34 discharge into the engine.

It will be noted from an inspection of FIG. 1 that the passages 34 are disposed adjacent to the intake port 24 in such a location that they will be opened at or slightly before the time that each of the chambers 23, 22 and 21 is exposed to the intake port 24. Thus, the passages 34 come into registry with each of these chambers at a time when the chamber is expanded in volume. This expansion in volume causes a reduced pressure which not only causes the intake charge to be delivered into the chamber through the port 24 but which will also cause a pressure differential to exist on the conduit 28. This pressure differential causes lubricating oil to be drawn through the conduit 28 into the chamber that is exposed to the passages 34.

The quantity of oil required to lubricate the apex seals is relatively small. Some means must be provided, therefore, for accurately metering the amount of lubricant drawn into each of the chambers 21, 22 and 23 during the induction cycle. Conventional metering orifices are unsatisfactory to meter the small quantities of flow because of difficulties in accurately controlling their size and because of the likelihood of these orifices being clogged with contaminants.

It has been discovered that the flow of lubricating oil through the conduit 28 may be accurately controlled at desirable rates through the use of a capillary type metering device. Specifically, a porous metering member 35 is positioned at the lower end of the conduit 28 for metering the flow of lubricant from the sump 26 through the conduit 28 into the chambers 21, 22 and 23 of the engine. Any of the known porous materials having the desired porosity may be used for this purpose. The porous metering member 35 provides a flow restriction to the oil and also, because of its porosity, causes air to mix with the oil that flows into the conduit 28. Thus, extremely small quantities of oil may be metered and effectively distributed to the parts of the engine to be lubricated.

The viscosity of the lubricating oil changes significantly with temperature variations. Thus, as the engine becomes heated and specifically as the lubricating oil rises in temperature an increased flow of lubricant to the chambers will result unless other compensation is provided. In order to maintain a considerably uniform flow rate at all lubricant temperatures a temperature compensating mechanism, indicated generally by the reference numeral 36 is provided. The temperature compensating mechanism 36 includes a cup shaped reservoir 37 that is supported in the sump 26 for vertical movement within a cylindrical sleeve 38. A pair of bimetal springs or washers 39 are disposed between the lower end of the sleeve 38 and the bottom of the reservoir 37. Suitable apertures may be formed in the sleeve 38 so as to permit the lubricant from the sump 26 to surround the bimetallic washers 39. Oil is delivered to the reservoir 37 from the oil pump which is not illustrated but which has been previously mentioned by means of a return line 41. The returning oil will fill the reservoir 37 and flow over its top into the sump 26. Thus, the uniform head of lubricating oil will always be presented in the reservoir 37.

The bimetallic springs 39 are constructed so that they will assume a more flattened configuration as their temperature rises. As the result the reservoir 37 will slide downwardly in the sleeve 38 and a lesser amount of the porous metering member 35 will be immersed in the reservoir 37 as the temperature increases. Because the immersion is reduced, a longer flow path through the metering member 35 is provided at elevated temperatures. Thus, the less viscous oil has a longer flow path and a reduction in the flow rate will occur. This reduction is sufficient to compensate for the reduced viscosity and will result in a fairly uniform flow of lubricating oils to the chambers 21, 22 and 23 regardless of the temperature of the lubricant. It is to be understood, however, that it may be desirable to alter the flow rate so that it is not completely uniform at all temperatures. Such an arrangement is within the purvue of this invention.

In the embodiment of FIGS. 1 through 3, only the apex seals 19 were lubricated by the lubricating system which forms the subject of this invention. The bearings of the engine were lubricated by means of a lubricating system as described in the aforenoted U.S. Letters Patent No. 3,583,371. This arrangement has utility in mechanisms embodying plain bearings. In some instances, particularly in conjunction with roller bearing mechanisms, it may be desirable to also lubricate the various bearing surfaces of the mechanism by a lubricating system that is operated by differential pressures. Such an embodiment is shown in FIG. 4.

In this figure, the engine embodying the invention is identified generally by the reference numeral 71. FIG. 4 is a sectional view taken along a plane that is perpendicular to the plane of FIG. 1 and passes through the axis output shaft so that the lubricating system may be shown in more detail.

The engine 71 is comprised of an outer housing 72 that defines a lobed cavity 73. The opposite sides of the cavity 73 are closed by end plates 74 and 75. A lobed rotary piston 76 is positioned between the cavity 73 and is supported for movement upon the eccentric 77 of an output shaft 78 by means of anti-friction bearings 80. An internal gear 79 on the piston 76 meshes with an external gear 81 that is fixed relative to the end plate 75 so as to time the motion of the rotary piston 76 relative to the outer housing. As in the previous embodiment, apex seals 82 (only one of which appears in the drawings) are positioned at the lobes of the piston 76 to divide the cavity of the engine into a number of chambers. A charge is delivered from these chambers from suitable intake and exhaust ports (not shown). In addition, the spark plug (also not shown) is provided for firing the charge.

The end plate 74 is counterbored at 83 to receive an anti-friction roller bearing assembly 84 that rotatably journals one end of the output shaft 78. The opposite end of the output shaft 78 is journalled by means of a roller bearing 85 and thrust bearing 86 which bearings are supported by the end plate 75.

The lubricating system for the engine is shown schematically in this Figure and includes a sump 87 in which lubricant is contained at a level, indicated by the line 88. An oil pickup tube 89 is positioned within the sump 87 and is carried by a float mechanism 91. A capillary type metering device in the form of a porous member 92 is positioned at the lower end of the pickup tube 89 and depends into the sump below the lubricant level 88. A temperature responsive mechanism (not shown) is provided for adjusting the position of the metering device 92 relative to the float 91 so as to change the degree of immersion dependent upon the temperature of the lubricating oil. Thus, the effects of viscosity changes due to temperature variations is minimized.

The pickup tube 89 delivers oil to a first lubricating passage or conduit 93 which terminates in a fitting 94. The fitting 94 is threaded into the end plate 74 and registers with a drilled passage 95 that extends parallel to the axis of the output shaft 78. The passage 95 is intersected by a plurality of passages 96 that extend into the engine chambers in an area in proximity to the intake port as described in conjunction with the embodiment of FIGS. 1 through 3. The passages 96 deliver lubricating oil to the apex seals 82 as aforedescribed.

The passage or conduit 93 is intersected by a second lubricating passage or conduit 97. The conduit 97 terminates in a fitting 98 that is threaded into a tapped opening 99 formed in the end plate 75. A passage 101 intersects the termination of the tapped opening 99 and extends into a counterbore 102 adjacent the thrust bearing 86. The outer end of the counterbore 102 is closed by any suitable oil seal 103.

The output shaft 78 is formed with a drilled passage 104 that extends from a point adjacent the inner termination of the anti-friction bearing 85 to a cross drilled passage 105 formed in the eccentric 77. The cross drilled passage 105 is intersected by another drilled passage 106 formed in the output shaft 78 which terminates adjacent the anti-friction bearing 84. The outer end of the counterbore 83 is closed by a suitable oil seal 107. Between the outer end of the bearing 84 and the oil seal 107 the end wall 84 is formed with a drilled passage 108 that extends into the chamber of the engine adjacent the intake port and adjacent the area of the chamber in registry with the passages 96.

It should be readily apparent that the inner termination of the passage 108 experiences the reduced pressure in the engine that is generated during expansion of the chamber in registry with the intake port. Thus, a pressure differential will exist across the lubricated conduit provided for by the passages 108, 106, 105, 104, 101 and conduit 97. This pressure differential causes a metered amount of oil to be drawn through the metering device 92, pickup tube 89 and conduit 97 to the counterbore 102. As in the preceding embodiment, the porous metering device 91 introduces air into the oil for further assisting in the metering of small quantities of oil. This oil air mixture flows across the bearings 86 and 85 and into the drilled passage 104 for delivery to the drilled passages 105 and 106. The passage 105 affords lubricating oil to the eccentric 77 and a portion of the piston 76 journalled on the eccentric. The passage 106 delivers lubricant to the bearing 84 and such lubricant will be delivered through the passage 108 into the chamber to afford further lubrication of the apex seals 82.

It should be readily apparent that the embodiment of FIG. 4 provides lubrication for all bearing surfaces of the engine and for the apex seals without the use of engine driven pumps or without the necessity of mixing lubricating oil with the fuel. Of course, the relative amounts of lubricating oil that flow through the passages 93 and 97 may be suitably regulated by changing the diameter of these passages or of any of the passages in the respective flow paths. Alternatively, each passages 93 and 97 may have a separate connection to the oil in the sump 87 and separate metering at this point.

It is to be understood that the foregoing description is that of preferred embodiments of the invention. Various changes and modifications may be made without departing from the spirit and scope of the invention as defined by the appended claims.

I claim:

1. A lubricating system for a mechanism having an outer housing defining a two-lobed cavity, a generally triangular shaped piston positioned in said cavity and dividing said cavity into three chambers, means for supporting said outer housing and said piston for relative movement for cyclically varying the volumes of said chambers, and a sump for lubricant, said system comprising a pick-up member, a float for supporting said pick-up member within the sump and conduit means leading from said sump to a portion of said cavity in which the respective chamber increases in volume upon such relative movement for introducing lubricant from said sump to said chamber under the influence of pressure differences generated by expansion of the volume of said chamber and metering means for controlling the flow through said conduit means.

2. A lubricating system as set forth in claim 1 wherein the metering means includes a capillary device for regulating the flow.

3. A lubricating system as set forth in claim 2 wherein the capillary device comprises a porous member immersed at least in part in the lubricant in the sump.

4. A lubricating system as set forth in claim 1 wherein the mechanism includes bearings for rotatably supporting components thereof, the lubrication system including a conduit leading from the sump past at least certain of said bearings to the chamber for lubricating said bearings.

5. A lubricating system as set forth in claim 4 wherein the metering means controls the flow through each of the conduits.

* * * * *

UNITED STATES PATENT OFFICE
CERTIFICATE OF CORRECTION

Patent No. 3,811,806          Dated May 21, 1974

Inventor(s)  Robert W. King

It is certified that error appears in the above-identified patent and that said Letters Patent are hereby corrected as shown below:

In the References:  "3,460,814    2/1949    Derr, Jr." should be

-- 2,460,814    2/1949    Duerr, Jr. --.

Signed and sealed this 1st day of October 1974.

(SEAL)
Attest:

McCOY M. GIBSON JR.                C. MARSHALL DANN
Attesting Officer                  Commissioner of Patents